United States Patent Office 3,536,741
Patented Oct. 27, 1970

3,536,741
REACTION PRODUCTS OF A BORATE ESTER WITH THE CHLORIDE OF A METAL SELECTED FROM Ga (III), In (III) and Sb (V)
Robert C. Wade, Ipswich, Mass., assignor to Ventron Corporation, Beverly, Mass., a corporation of Massachusetts
No Drawing. Continuation-in-part of application Ser. No. 670,419, Sept. 25, 1967, now Patent No. 3,455,976, which is a continuation-in-part of application Ser. No. 608,250, Jan. 10, 1967. This application Apr. 16, 1969, Ser. No. 816,829
Int. Cl. C09f 5/00, 9/90, 9/92
U.S. Cl. 260—429   13 Claims

ABSTRACT OF THE DISCLOSURE

The invention provides products of unknown complex chemical structure having highly useful properties. These products are produced by reacting a substantially anhydrous borate ester, such as trimethyl borate, triethyl borate, tripropyl borate, tributyl borate, trihexyl borate, trihexylene glycol biborate, trimethoxyboroxine, and tri (m, p) cresyl borate with a substantially anhydrous chloride of a metal selected from the group consisting of Ga (III), Sb (V) and In (III) in a molar ratio of at least about 0.33 mole of borate ester for each mole of the chloride of the selected metal in an inert substantially anhydrous diluent, such as excess borate ester, methylene chloride, chloroform, or carbon tetrachloride, at a temperature between room temperature and about 200° C. until the reaction mixture ceases to give off organic chloride. By removing the volatile material from the reaction mixture by evaporation, the product of complex chemical structure may be isolated and comprises the selected metal, boron, carbon, hydrogen, chlorine, and oxygen. These complex products are soluble in water giving acidic solutions. When freshly prepared in methylene chloride they are at least partly soluble in carbon tetrachloride, chloroform, acetone, and glycol ethers, such as monomethyl ethylene glycol and dimethyl ethylene glycol ethers. These complex products are useful as mild Friedel Crafts type catalysts useful to promote the isomerization of olefins and the alkylation of aromatic compounds.

This invention relates to compounds of complex chemical structure produced by the reaction of a borate ester with the trichloride of gallium or indium.

This application is a continuation-in-part of my copending application Serial No. 670,419, filed Sept. 25, 1967 now Patent No. 3,455,976, which is a continuation-in-part of my copending application Serial No. 608,250 now abandoned, filed Jan. 10, 1967.

My copending application Serial No. 670,419, filed Sept. 25, 1967, describes the preparation of products of complex chemical structure by reacting a substantially anhydrous borate ester, such as trimethyl borate, triethyl borate, tripropyl borate, tributyl borate, trihexyl boate, trihexylene glycol biborate, and tri (m, p) cresyl borate, with a substantially anhydrous chloride of a metal selected from Ti (IV), Zr (IV), Hf (IV), Al (III), Fe (III), Mo (V), Nb (V), Sn (IV), Ta (V) and W (VI) in a molar ratio of at least about 0.33 mole of borate ester for each mole of the chloride of the selected metal in a substantially anhydrous diluent, such as methylene chloride, chloroform, carbon tetrachloride, or an excess of borate ester, until the reaction mixture ceases to give off organic chloride. When the organic chloride ceases to be given off the reaction is essentially complete. By removing volatile material such as the diluent or excess borate ester, a solid product is obtained which appears to be polymeric in nature and comprises the selected metal boron, carbon, hydrogen, chlorine, and oxygen.

These complex products of complex chemical structure are partly soluble in water, methylene chloride, chloroform, carbon tetrachloride, acetone, and glycol ethers, such as monomethyl ethylene glycol and dimethyl ethylene glycol ethers. When a solution thereof is applied to glass surfaces, such as glass fabrics, and the solvent evaporated, delustering occurs and a marked water repellency develops. These products of complex chemical structure not only have a high affinity for all types of glass but also for certain compounds containing free hydroxyl groups. Thus, they may be used to bind hydroxylic compounds, such as polyvinyl alcohol, to glass surfaces from aqueous or non-aqueous solutions, the glass having previously been coated with the product of complex chemical structure. When dried the normally water-soluble coating materials are rendered substantialy water-insoluble on the surface of the glass. Glass so treated is capable of being dyed with vat dyes or other dyes normally used on cellulose fibres to give full dyeings.

I have now discovered that in addition to the chlorides of the metals previously mentioned, I may use the chlorides of Go (III), Sb (V), and In (III) and also trimethoxyboroxine as the borate ester to produce compounds of complex chemical structure by a procedure similar to that previously described. These compounds are useful as mild Friedel-Crafts catalysts useful to promote the isomerization of olefins and the alkylation of aromatic compounds.

I have also discovered thot compounds of complex chemical structure containing two of the above mentioned metals, one of which is antimony, may be obtained by either of the following two methods. By the first method a mixture of two chlorides selected from the above mentioned groups, one of which is antimony pentachloride, is reacted with a borate ester in a manner as above described until organic chloride ceases to be given off.

By the second of the two above mentioned methods, the borate ester is reacted with a chloride of a first metal selected from the above groups in a manner as above described until organic chloride ceases to be given off thereby forming a liquor comprising the diluent and a compound of complex chemical structure. Then a chloride of a second metal selected from the above group is added to the last mentioned liquor and is permitted to react with the last mentioned compound of complex chemical structure at a temperature between room temperature and about 200° C. until organic chloride ceases to be given off thereby forming a liquor comprising the diluent and a second compound of complex chemical structure comprising the two metals, boron, carbon, hydrogen, chlorine, and oxygen. Antimony pentachloride may be used as the chloride of the first or second selected metal.

In addition to the inert diluents previously mentioned, these complex reactions may also be carried out in aliphatic hydrocarbons, such as petroleum ether, hexane, heptane, octane, and cyclohexene. However, the reactions proceed more slowly in these diluents and therefore, are not preferred.

In this specification and appended claims, the term "borate ester," unless otherwise specified, is intended to be limited to a borate ester in which all three hydrogens of boric acid have been reacted with an alcohol.

The invention is illustrated further by the following specific examples.

EXAMPLE 1

11 grams (0.05 mole) of $InCl_3$ were mixed with 25 grams of $CH_2Cl_2$. Then 10.4 grams (0.1 mole) $B(OCH_3)_3$ was added with stirring. A small temperature rise was noted. The mixture was refluxed for about 22 hours. Methyl chloride was slowly evolved. The reaction mixture remained a slurry throughout the reaction period. 13.9 grams of grayish white solid product were recovered by vacuum evaporation of the methylene chloride and excess methyl borate. The analysis showed:

In=40.8%, Cl=32.3%, B=2.2%, OCH$_3$=20.5%

EXAMPLE 2

In a similar experiment, 10 grams (0.056 mole) of GaCl$_3$ were reacted with 11.6 grams (0.112 mole) of B(OCH$_3$)$_3$ in 25 grams of CH$_2$Cl. A vigorous reaction took place and a clear orange-brown solution was obtained. Methyl chloride was evolved from the reaction. After about 3 hours the reaction appeared to be complete. 12.3 grams of solid product were recovered by vacuum evaporation of the methylene chloride and excess borate. Analysis of this product showed:

Ga=27.8%, Cl=33.1%, B=4.1%
Ratio  1         2        1

EXAMPLE 3

In this experiment 17.3 grams (0.1 mole) of trimethoxyboroxine was dissolved in 100 grams of methylene chloride and 19 grams (0.1 mole) of TiCl$_4$ added over a period of about 6 minutes. The temperature rose spontaneously about 10° C. Methyl chloride was evolved over a period of about 2 hours. There was finally recovered about 37 grams of yellow solid product which analyzed:

Ti=14.9%, B=11.2%, Cl=25.8%, OCH$_3$=22.2%

EXAMPLE 4

86.5 grams (0.5 mole) of trimethoxyboroxine was dissolved in 200 grams of methylene chloride. To this was added, with stirring, 47.5 grams (0.25 mole) of TiCl$_4$ over a period of about 43 minutes. The reaction mixture was refluxed at 40–43° C. for about 2 hours. Methyl chloride was evolved during the run. The product was isolated by vacuum evaporation of the methylene chloride. There was recovered 117 grams of yellow solid product. Analysis of the product showed the following:

Ti=10.6%, Cl=14.2%, B=14.0%, OCH$_3$=28.0%

EXAMPLE 5

In this example, 149.5 g. (0.5 mole) SbCl$_5$ was dissolved and dispersed in 327 g. CH$_2$Cl$_2$. Then 104 g. (1.0 mole) of B(OCH$_3$)$_3$ was added over a 2-hour period. The temperature increased from about 23° C. to about 34° C. Methyl chloride was evolved. When methyl chloride evolution was complete (after about 4.5 hrs. from the start of experiment) the methylene chloride was removed by vacuum evaporation. There was recovered about 175 grams of dark brown solid product which analyzed:

Sb=37.4%, Cl=29.5%, B=4.1%, OCH$_3$=9.3%
Ratio 1    2.7      1.2      1

EXAMPLE 6

In this example, 104 g. of methyl borate diluted with 300 g. CH$_2$Cl$_2$ was placed in the reaction flask and 149.5 (0.5 mole) SbCl$_5$ was added from a dropping funnel over a 1 hr. period. The reaction temperature rose spontaneously from about 25° C. to 42° C. Methyl chloride was evolved. When this evolution was complete, the methylene chloride was removed by vacuum evaporation. There was recovered about 184 grams of light tan powder which had the following analysis:

Sb=33.4%, Cl=20.8%, B=4.0%, OCH$_3$=9.6%
Ratio 1    2.1      1.3     1.1

In my copending application Ser. No. 670,419, filed Sept. 25, 1967. I have claimed methods for producing compounds of unknown complex chemical structure by reacting a borate ester, such as trimethyl borate, triethyl borate, tripropyl borate, tributyl borate, trihexyl borate, trihexylene glycol biborate, and tri (m, p) cresyl borate with a chloride of a metal selected from the group consisting of Ti (IV), Zr (IV), Hf (IV) and Sn (IV) together with the complex compounds formed thereby.

In my copending application Ser. No. 670,450, filed Sept. 25, 1967, now Pat. No. 3,457,289, I have claimed methods for producing compounds of unknown complex chemical structure by reacting a borate ester, such as trimethyl borate, triethyl borate, tripropyl borate, tributyl borate, trihexyl borate, trihexylene glycol biborate, and tri (m, p) cresyl borate with a chloride of a metal selected from the group consisting of Al (III) and Fe (III) together with the complex compounds formed thereby.

In my copending application Ser. No. 670,449, filed Jan. 28, 1969, now Pat. No. 3,462,469, I have claimed methods for producing compounds of unknown complex chemical structure by reacting a borate ester, such as trimethyl borate, triethyl borate, tripropyl borate, tributyl borate, trihexyl borate, trihexylene glycol biborate, and tri (m, p) cresyl borate with a chloride of a metal selected from the group consisting of Mo (V), Nb (V), Ta (V) and W (II) together with the complex compounds formed thereby.

In my copending application Ser. No. 786,447, filed Dec. 23, 1968, I have claimed methods for producing compounds of unknown complex chemical structure by reacting a borate ester, such as trimethyl borate, triethyl borate, tripropyl borate, tributyl borate, trihexyl borate, trihexylene glycol biborate, trimethoxyboroxine, and tri (m, p) cresyl borate with a mixture of at least two chlorides of metals selected from the group consisting of Ti (IV), Zr (IV), Hf (IV), Sn (IV), Al (III), Fe (III), Ga (III), In (III), Mo (V), Ta (V) and W (VI) together with the complex compounds formed thereby.

In my copending application Ser. No. 776,804, filed Nov. 18, 1968, I have claimed methods for producing compounds of unknown complex chemical structure by reacting a chloride of a first metal selected from the group consisting of Ti (IV), Zr (IV), Hf (IV), Sn (IV), Al (III), Fe (III), Ga (III), In (III), Mo (V), Nb (V), Ta (V), and W (VI) in an inert diluent until organic chloride ceases to be given off thereby forming a first liquor comprising said diluent and a compound of unknown complex chemical structure, and then adding to said liquor a chloride of a second selected metal and permitting it to react with said compound thereby forming a second liquor comprising said diluent and a second compound of unknown complex chemical structure. The second compound of complex chemical structure also is claimed in this application.

In my copending application Ser. No. 814,851, filed Apr. 4, 1969, I have claimed methods for producing compounds of unknown complex chemical structure by reacting trimethoxyboroxine with a chloride of a metal selected from the group consisting of Ti (IV), Zr (IV), Hf (IV), Sn (IV), Al (III), Fe (III), Ga (III), In (III), Sb (V), Mo (V), Nb (V), Ta (V) and W (VI), together with the complex compounds formed thereby.

I claim:
1. The method which comprises mixing (at least one) a substantially anhydrous borate ester with a substantially anhydrous chloride of a metal selected from the group consisting of Ga(III), In(III) and Sb(V) in a molar ratio of at least about 0.33 mole of borate ester for each mole of the chloride of the selected metal in an inert substantially anhydrous diluent, permitting the chloride of the selected metal to react with the borate ester at a temperature between room temperature and about 200° C. until the reaction mixture ceases to give off organic chloride thereby forming a liquor comprising said diluent and a compound of complex chemical structure comprising the selected metal, boron, carbon, hydrogen, chlorine, and oxygen, said borate ester being selected from the group consisting of trimethyl borate, triethyl borate, tripropyl borate, tributyl borate, trihexyl borate, trihexylene glycol biborate, trimethoxyboroxine, and tri(m,p)cresyl borate.

2. A compound of complex chemical structure produced by the method as claimed by claim 1.

3. The method as claimed by claim 1 wherein said diluent is selected from the group consisting of the borate ester, methylene chloride, chloroform, and carbon tetrachloride.

4. A compound of complex chemical structure produced by the method as claimed by claim 2.

5. The method which comprises mixing substantially anhydrous trimethyl borate with a substantially anhydrous chloride of a metal selected from the group consisting of Ga(III), In(III) and Sb(V) in a molar ratio of at least about 0.33 mole of trimethyl borate for each mole of the chloride of the selected metal in a substantially anhydrous diluent, permitting the chloride of the selected metal to react with said borate at a temperature between room temperature and about 120° C. until the reaction mixture ceases to give off methyl chloride thereby forming a liquor comprising said diluent and a compound of complex chemical structure comprising the selected metal, boron, carbon, hydrogen, chlorine, and oxygen.

6. The method as claimed by claim 5 wherein said diluent is selected from the group consisting of said borate, methylene chloride, chloroform, and carbon tetrachloride.

7. A compound of complex chemical structure produced by the method claimed by claim 5.

8. The method as claimed by claim 5 wherein the chloride of the selected metal is gallium trichloride.

9. The method as claimed by claim 5 wherein the chloride of the selected metal is indium trichloride.

10. The method as claimed by claim 5 wherein the selected metal is antimony pentachloride.

11. A compound of complex chemical structure produced by the method claimed by claim 8.

12. A compound of complex chemical structure produced by the method claimed by claim 9.

13. A compound of complex chemical structure produced by the method claimed by claim 10.

References Cited

UNITED STATES PATENTS 2,941,981  6/1960  Elbling et al. ____ 260—429.5 XR
3,455,976  7/1969  Wade _____ 260—429.3

TOBIAS E. LEVOW, Primary Examiner

A. P. DEMERS, Assistant Examiner

U.S. Cl. X.R.

106—2; 117—124, 135.5, 143; 260—446